United States Patent [19]

Schneider

[11] Patent Number: 5,579,424
[45] Date of Patent: Nov. 26, 1996

[54] ARRANGEMENT FOR AN OPTICAL COUPLING OF A FIBER TO A PLANAR OPTICAL WAVEGUIDE AND A METHOD OF FORMING THE ARRANGEMENT

[75] Inventor: Hartmut Schneider, Munich, Germany

[73] Assignee: Siemens Aktiengesellschaft, Munich, Germany

[21] Appl. No.: 561,137

[22] Filed: Nov. 21, 1995

Related U.S. Application Data

[63] Continuation of Ser. No. 242,263, May 13, 1994, abandoned.

[30]     Foreign Application Priority Data

Jun. 18, 1993 [DE] Germany ............................ 43 20 249.7

[51] Int. Cl.⁶ ..................................................... G02B 6/30
[52] U.S. Cl. ................... 385/49; 385/50; 385/52; 385/39; 216/24; 216/51; 216/52; 216/79; 216/99
[58] Field of Search ............................. 385/49, 50, 52, 385/39; 156/662, 657, 645, 663

[56]             References Cited

U.S. PATENT DOCUMENTS

| | | | |
|---|---|---|---|
| 4,973,133 | 11/1990 | Matz et al. | |
| 5,046,809 | 9/1991 | Stein | 385/49 |
| 5,125,946 | 6/1992 | Bhagavatula | 156/663 X |
| 5,239,601 | 8/1993 | Denis et al. | |
| 5,299,276 | 3/1994 | Okamura et al. | 385/49 X |
| 5,343,544 | 8/1994 | Boyd et al. | 385/49 X |
| 5,357,593 | 10/1994 | Bossler | 385/49 |

FOREIGN PATENT DOCUMENTS

| | | |
|---|---|---|
| 0361153 | 4/1990 | European Pat. Off. |
| 0532470 | 3/1993 | European Pat. Off. |
| 8525398 | 12/1988 | Germany |
| 2-157805 | 6/1990 | Japan |
| 5-134135 | 5/1993 | Japan ......................................... 385/49 |
| WO91/13378 | 9/1991 | WIPO |

OTHER PUBLICATIONS

Henry et al, "Glass Waveguides on Silicon for Hybrid Optical Packaging", *Journal of Lightwave Technology*, vol. 7, No. 10, Oct. 1989, pp. 1530–1539.

Schneider, "Realization of $SiO_2$–$B_2O_3$–$TiO_2$ Waveguides and Reflectors on Si Substrates", *Mat. Res. Soc. Symp. Proc.*, vol. 244 (1992), pp. 337–342. (no month avail.).

Petersen, "Silicon as a Mechanical Material", *Proceedings of the IEEE*, vol. 70, No. 5, May 1982, pp. 420–457.

Bhagavatula, "A Review of Optical Component Connectorization and Pigtailing Techniques", *Advances in Electronic Packaging, Proc., 1993 ASME Intern. Electronics Packaging Conf.*, pp. 1157–1161. (no month available).

*Primary Examiner*—Rodney B. Bovernick
*Assistant Examiner*—Yisun Song
*Attorney, Agent, or Firm*—Hill, Steadman & Simpson

[57]             ABSTRACT

An arrangement for optically coupling a planar optical waveguide and an optical fiber comprises forming a planar optical waveguide on a surface of the substrate, forming a trench-like depression in the surface of the substrate leading from an end face of the planar waveguide to an edge of the substrate, forming a second holder part having a fiber secured between two planar surfaces lying in a common plane, assembling the separate holder part on a pair of planar surfaces lying on each side of the depression of said substrate so that the fiber is placed in the depression with play and the fiber will be arranged with the axis of the fiber being aligned with the axis of the planar waveguide.

18 Claims, 3 Drawing Sheets

ARRANGEMENT FOR AN OPTICAL COUPLING OF A FIBER TO A PLANAR OPTICAL WAVEGUIDE AND A METHOD OF FORMING THE ARRANGEMENT

This a continuation of application Ser. No. 08/242,263, filed May 13, 1994 now abandoned.

BACKGROUND OF THE INVENTION

The present invention is directed to an arrangement which has a substrate on which a planar waveguide is formed and which substrate has a trench-like depression in which an optical waveguide fiber is positioned with the core of the fiber being aligned with the planar waveguide of the substrate. The invention is also directed to a method of forming the arrangement.

U.S. Pat. No. 4,973,133, whose disclosure is incorporated herein by reference thereto and which claims priority from the same German Application 38 33 147 as claimed by European Published Application 0 361 153, discloses a coupling arrangement that has a substrate with a carrying surface on which a planar waveguide is formed and the carrying surface is provided with a trench-like depression for receiving a fiber in a play-free and firm manner to be in alignment with the planar waveguide. In this known arrangement, the trench-like depression and the carrier surface of the substrate forms a guide channel for the fiber, wherein the fiber is held play-free and firmly and for this reason must be adjusted very exactly in advance with reference to the planar waveguide, particularly relative to the longitudinal axis of the planar waveguide. To that end, the position of the planar waveguide or the longitudinal axis thereof must be exactly known both vertically as well as laterally with reference to the carrying surface of the substrate. Over and above this, the guide channel must be exactly dimensioned with reference to the dimensions of the fiber.

The planar waveguide is composed of a first layer of a material having a first refractive index applied on the carrying surface of the substrate, a strip-shaped second layer with a longitudinal axis is arranged on the first layer and is composed of a material having a higher second refractive index in comparison to the first refractive index of the first layer, and then a third layer composed of a material having a refractive index that is lower in comparison to the second refractive index will cover the strip-shaped second layer. The strip-shaped second layer forms the core and the first and third layers form the cladding of the planar waveguide.

In this known arrangement, the substrate, the first layer and the third layer are composed, for example, of InP and the strip-shaped second layer is composed of a quaternary material, for example of InGaAsP.

An article, by C. H. Henry, G. E. Blonder, R. F. Kazarinov, entitled "Glass Waveguides on Silicon for Hybrid Optical Packaging", *Journal of Light Waveguide Technology*, Vol. 7, No. 10, October 1989, pp. 1530–1539, discloses that optical circuits for distributing, for receiving, for transmitting or for amplifying optical signals in optical communication technology are often executed in planar technology in doped silica glass ($SiO_2$) on substrates of Si, for example Si wafers.

A planar waveguide of doped silica glass on a substrate of Si similar to the planar waveguide of the above-mentioned U.S. Patent is known, for example, from an article by H. W. Schneider entitled "Realization of $SiO_2$—$B_2O_3$—$TiO_2$ Waveguides and Reflectors on SI Substrates", *Mat. Res. Soc. Symp. Proc.*, Vol. 244 (1992), pp. 337–342. This waveguide comprises a first layer of $SiO_2$ doped with $B_2O_3$ applied on a carrying surface of a substrate, a strip-shaped second layer of $SiO_2$ doped with $B_2O_3$ and $TiO_2$ arranged on the first layer, and a third layer of $SiO_2$ doped with $B_2O_3$ that covers the strip-shaped second layer.

The manufacture of this planar waveguide of doped silica glass can, according to the article by Schneider, occur so that the first layer of $SiO_2$ doped with $B_2O_3$ is deposited on the carrying surface of the substrate of Si, and the second layer of $SiO_2$ doped with $B_2O_3$ and $TiO_3$ is deposited on the first layer. One or more strips of mask layers of amorphous silica are arranged at a distance from one another and are produced on the surface of the second layer. The second layer is etched away outside the strip on the basis of a reactive ion etching method having an etchant that attacks the material of the second layer but not the amorphous silicon, so that one or more strip-shaped raised ridges of the second layer remain on the first layer, and these ridges are covered with the amorphous silicon. The amorphous silicon is removed and the remaining raised ridge or ridges of the material of the second layer are now covered by deposition of a third layer from an $SiO_2$ doped $B_2O_3$. As in the planar waveguide according to the above-mentioned U.S. Patent, each ridge forms a core and the first and third layers form the cladding of the planar waveguide whose longitudinal axis is defined by a longitudinal axis of its strip-shaped ridge composed of the material of the second layer.

Because of the manufacturing conditions, the three doped silica layers produced in this method have thickness fluctuations up to 0.5 μm so that the vertical position of the core of the planar waveguide over the carrying surface of the substrate or, respectively, under the surface of the third layer is poorly defined. The lateral position of the core in the direction parallel to the carrying surface and perpendicular relative to the longitudinal axis is initially also unknown.

SUMMARY OF THE INVENTION

The object of the present invention is to provide an arrangement for coupling a fiber optic to a planar waveguide wherein the exact adjustment of the trench-like depression in the carrying surface of the substrate with reference to the longitudinal axis of the planar waveguide and/or an exact dimensioning of the depression with reference to the fiber is of no concern. The object is also to provide a method of forming this arrangement.

To accomplish these goals with regard to the arrangement, the present invention is directed to an improvement in an arrangement for optical coupling of a planar waveguide integrated on a carrying surface of the substrate with an optical fiber, wherein the planar waveguide comprises a defined central longitudinal axis parallel to the carrying surface and the end face of the waveguide extends essentially perpendicular to the axis and faces toward a defined edge of the substrate that bounds the carrying surface and the end face is located a defined distance from the edge, the trench-like depression is fashioned in the carrying surface of the substrate between the end face of the planar waveguide and the edge of the substrate and the trench-like depression extends between the two planar surfaces arranged on both sides of the longitudinal axis of the planar waveguide and in a common plane extending from the edge of the substrate in the direction of the longitudinal axis of the planar waveguide up to the end face thereof, and the fiber is acceptable thereto with an end face of the fiber so that the end face of the fiber faces toward the end face of the planar waveguide in a defined central longitudinal axis of the fiber and the longitudinal axis of the planar waveguide are aligned with one another. The improvements are that the fiber is fixed in a separate holder part between two planar surfaces which are arranged in a common plane. The two planar surfaces of the holding part lie on two planar surfaces of the substrate with the end face of the fiber facing toward the end face of the planar waveguide as the fiber is arranged in a trench-like depression in the carrying surface of the substrate and a distance of a longitudinal axis of the fixed fiber that is vertical relative to the common plane of the planar surfaces of the holder part is dimensioned so that the longitudinal axis of the fiber, given the holding part having the planar surfaces lying on the planar surfaces of the substrate, lies essentially at the same height as the longitudinal axis of the planar waveguide with reference to the common plane of the two planar surfaces on top of one another and the fiber is arranged in the depression with a play.

The invention has the advantage that the trench-like depression need only be roughly adjusted on the longitudinal axis of the planar waveguide and can be dimensioned of such a size with reference to the fiber that the fiber is arranged with play in this depression when the longitudinal axis of the fiber and planar waveguide lie at the same height with reference to the common plane of the planar surfaces of the substrate, particularly when these longitudinal axes will be aligned.

The same height of the longitudinal axes can be achieved on the basis of the planar surfaces of the substrate and of the holding part when these surfaces are fixed in advance so that with reference to the longitudinal axes of the waveguide and the fiber the longitudinal axes lie at the same height by themselves given the planar surfaces of the substrate and the holding part lying on top of one another.

When the substrate and the holder part, which has the fiber secured thereon, are correspondingly brought together so that the planar surfaces of the substrate and the planar surfaces of the holding part lie on top of one another and the fiber is arranged between the planar surfaces with play in the trench-like depression and has its end face facing toward the end face of the waveguide, the longitudinal axes are already vertically adjusted with reference to the carrying surface of the substrate. An adjustment parallel to the carrying surface of the substrate and perpendicular relative to the longitudinal axis of the planar waveguide is then all that remains to be undertaken.

This adjustment can be undertaken on the basis of an active adjustment wherein the optical coupling is optimized while monitoring the light passage through the coupling location between the fiber and the waveguide. This active coupling, however, is not especially easy to manufacture and, if possible, it should also be entirely avoided in this invention. The active adjustment is to be advantageously undertaken only parallel to the carrying surface of the substrate and not vertically relative to this carrying surface of the substrate, as well as this assumes a play in the fiber in the trench-like depression not only vertically but also parallel to the carrying surface.

The embodiment of the present invention includes providing on the planar surfaces of the substrate alignment and centering means for aligning and centering the longitudinal axis of the fiber and the longitudinal axis of the planar waveguide to one another. Preferably, this development includes a centering groove and a centering projection that are fashioned on one of the planar surfaces of the substrate and one of the planar surfaces of the holding part opposite one another to fit into one another when the surfaces are engaged. It should be pointed out that the two edges of the planar surfaces of the substrate facing toward one another in the embodiment, so to speak, the opening of the trench-like depression in the carrying surface of the substrate through which the fiber is introduced into the depression. This specific opening does not allow any play of the fiber in the direction parallel to the carrying surface and perpendicular relative to the longitudinal axis of the waveguide. However, the trench-like depression must, in fact, offer play vertically relative to the carrying surface with reference to the fiber introduced into the depression so that the fiber can be introduced into the not-exactly- dimensioned depression without impediment until the planar surfaces of the holding part are brought on the planar surfaces of the substrate.

Play within the meaning of the invention means at least play in the direction vertically relative to the carrying surface but also covers play both in the direction vertically as well as the direction parallel to the carrying surface.

In the self-aligning embodiment, the development has not only the trench-like depression in the carrying surface of the substrate but also the planar surfaces of the substrate and on the holder part and the centering mechanism that are to be exactly adjusted with reference to the longitudinal axis of the waveguide and fiber. This is advantageous in view of the method of manufacture.

A preferred embodiment of the arrangement of the invention has the holder part with the fiber being arranged and fixed in a groove in the holder part between the planar surfaces of the holder part, this groove is a V-shaped groove relative to the longitudinal axis of the fiber fixed in the groove that is produced by anisotropically etching anisotropical etching material which forms the substrate.

The method for the manufacture of the substrate part that is especially suitable for an arrangement of the invention includes an improvement in forming the arrangement having the planar waveguide with a central longitudinal axis on the carrying surface and an end face essentially perpendicular relative to the longitudinal axis which faces toward a specific edge of the substrate, wherein a trench-like depression is fashioned in the carrying surface of the substrate between the end faces of the planar waveguide and the edge of the substrate, said trench-like depression proceeding between two planar surfaces arranged on both sides of the longitudinal axis of the planar waveguide and in a common plane and extending from the edge of the substrate in the direction of the longitudinal axis of the planar waveguide up to the end face. The improvements are that the planar waveguide is formed by a process of providing a substrate having a surface that forms the carrying surface and is limited by an edge of the substrate proceeding on a straight line, the first layer of a material having a specific first refractive index is applied surface-wide thereon, said first layer is covered with a second layer of material having a second refractive index that is higher in comparison to the first layer, the second layer is covered surface-wide with a mask layer of a material that is resistant to one or more specific erosion means which erodes the material of the first and second layers, at least three raised strip-like ridges are produced on the substrate by a local erosion on at least portions of mask layer of the second layer, and these ridges are then separated from one another by trench-like depressions extending up to the edge of the substrate and comprise defined longitudinal axes that are parallel to one another and to the carrying surface and are perpendicular relative to the edge, a mask layer is then removed from the middle ridge but is left on the two outer ridges and then the middle ridge freed of the mask layer is covered with a third layer of a material having a refractive index which is lower in comparison to the second refractive index, the third layer is then partially covered with a second mask layer of material that is resistant to the specific erosion means or a plurality of specific erosion means and is resistant to the erosion means that will erode the material of the third layer, the second mask is such that a region of the third layer remains free of the additional mask layer between the edge of the substrate and an edge of the additional or second mask that is arranged at a distance from this edge and parallel to the edge, the distance of the edge of the second mask and the edge of the substrate is essentially equal to a defined distance of the end face of the planar waveguide once formed from an edge of the substrate, the third, second and first layers in the region exposed by the second mask layer are removed essentially perpendicular relative to the carrying surface of the substrate with an erosion means which does not attack the material of either the first or second mask and the trench-like depression is introduced into the region of the carrying surface free of these three layers with the erosion means which does not attack the material of the first, second and third layer.

This method has the advantage that the planar surfaces of the substrate, between which the trench-like depression is arranged, can be manufactured in a simple way essentially self-aligning in its position vertically relative to the carrying surface of the substrate with great precision with reference to the longitudinal axis of the planar waveguide. The centering device can be manufactured in a similar simple way with which the longitudinal axis of the fiber is adjusted in the direction parallel to the carrying surface of the substrate with great precision relative to the longitudinal axis of the planar waveguide.

Preferably, the method further includes that the depression is introduced in the carrying surface of the substrate with an erosion means which attacks the material of the substrate and one or more of the masking layers but does not attack the material of the first, second and third layer.

Preferably, the substrate is of Si, the first layer is $SiO_2$ doped with $B_2O_3$, the second layer is $SiO_2$ doped with $B_2O_3$ and $TiO_2$, the first mask layer is of Si, the third layer is of $SiO_2$ doped with $B_2O_3$ and the second mask layer is also of Si. During the production of the three ridges, the one mask layer is eroded selectively region-by-region with a reactive ion etching method employing $HB_3$ and the second layer is eroded with a reactive ion etching method employing $CHF_3$ in the regions of the second layer freed of the first mask layer. The first mask layer is removed only from the middle region or ridge and not from the two outer regions. The middle ridge, freed of the first mask layer, is covered with the third layer. The third, second and first layers can be eroded with a reactive ion etching method which does not attack either of the mask layers and the trench-like depression is produced in the carrying surface of the substrate by etching with $SF_6$ and/or KOH. The first and second mask layers can be amorphous Si and the end face of the planar waveguide can be produced by sawing.

Other advantages and features of the invention will be readily apparent from the following description of the preferred embodiments, the drawings and claims.

BRIEF DESCRIPTION OF THE DRAWINGS

FIGS. 1–5 are perspective views showing various steps when forming a substrate part with a planar waveguide, wherein:

DESCRIPTION OF THE PREFERRED EMBODIMENTS

Figure 5:
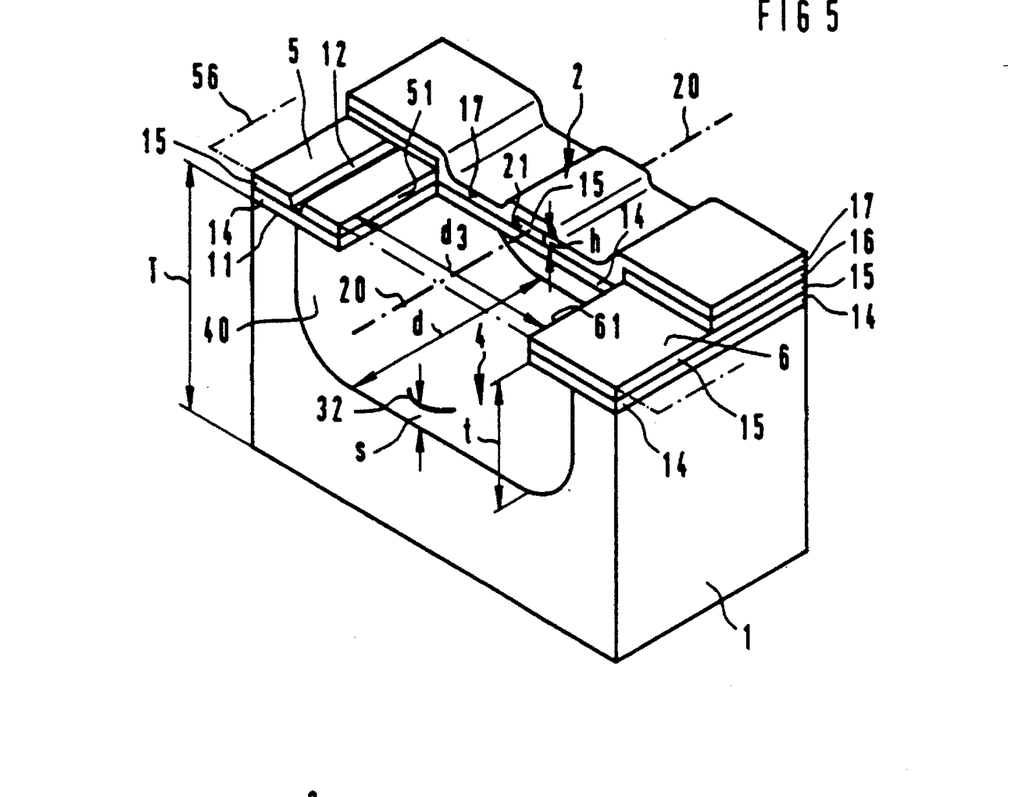
FIG. 5 shows the etching of exposed portions of the substrate to form the depression in the substrate.
Figure 6:
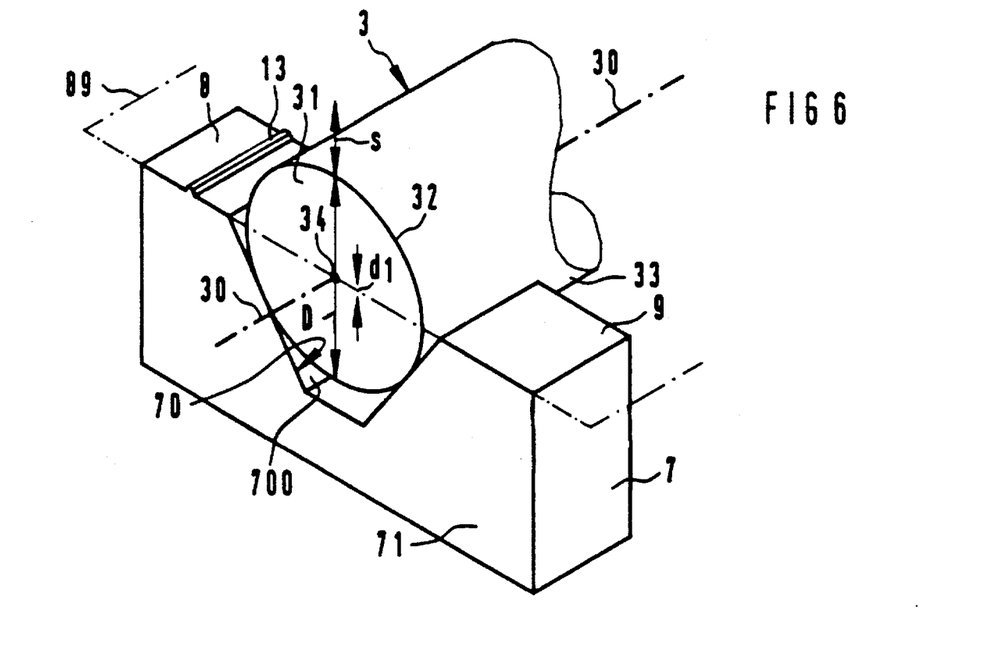
FIG. 6 is a perspective view illustrating a holder part having a fiber secured therein to coact with the substrate formed in FIG. 5.

The principles of the present invention are particularly useful in manufacturing an arrangement for forming a coupling between a planar waveguide having a substrate or portion illustrated in FIG. 5 coacting with a holding part and fiber of FIG. 6.

Figure 1:
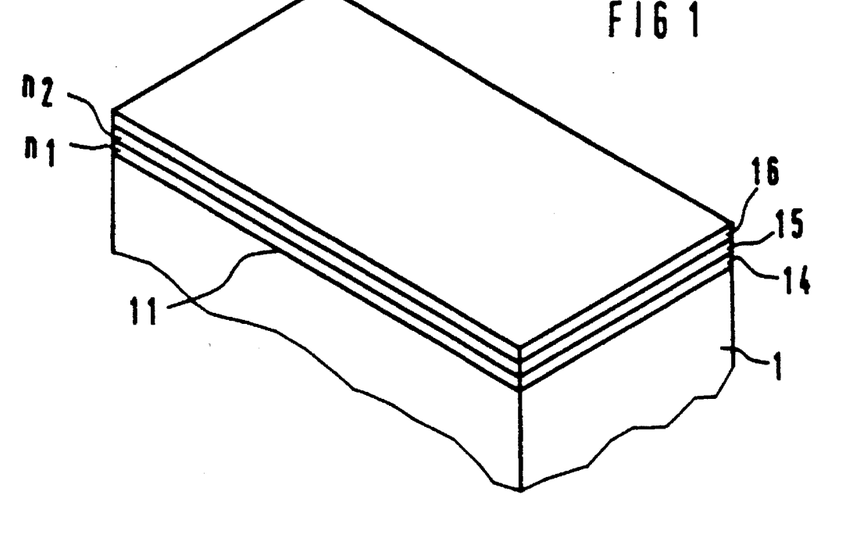
FIG. 1 shows a substrate with the first and second layers coated by the first masking layer.

The exemplary method for the manufacture of the substrate part for the exemplary arrangement begins with an initial part illustrated in FIG. 1 comprising a substrate 1 of Si having a surface that forms the carrying surface 10 (see FIG. 4) of the substrate 1 that is limited by an edge 11 proceeding on a straight line. A first layer 14 of $SiO_2$ that is doped with $B_2O_3$ and has a first refractive index $n_1$ is applied surface-wide on the carrying surface 10. The first layer is covered surface-wide with a second layer 15 of $SiO_2$ that is doped with $B_2O_3$ and $TiO_2$ and has a refractive index $n_2$ greater than $n_1$. The second layer 15 is covered surface-wide with a masking layer 16, preferably of an amorphous Si.

Figure 2:
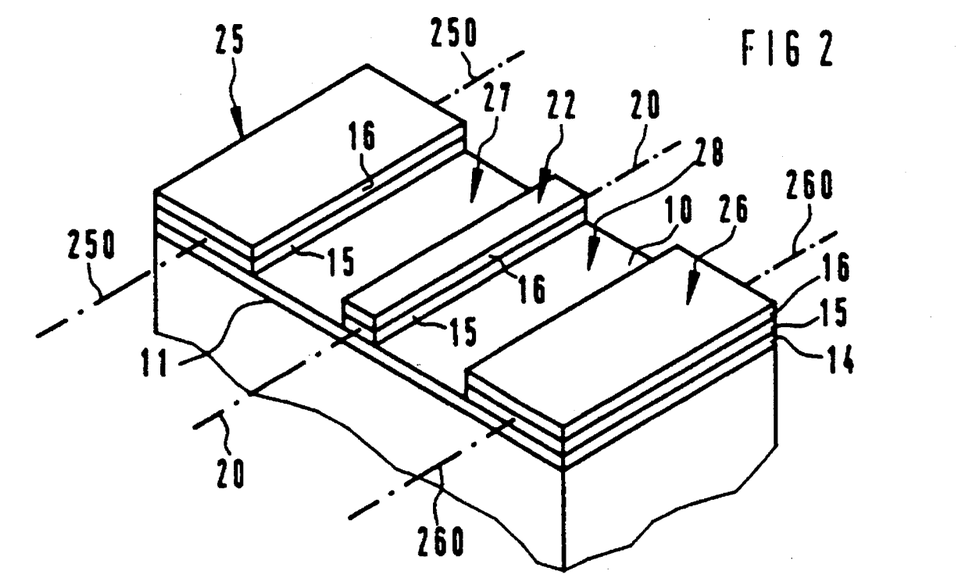
FIG. 2 shows forming the three ridge-like areas by removing portions of the second layer and first mask layer.

Three raised ridges 25, 22 and 26 of FIG. 2, which lie on the first layer 14, are composed of portions of layers 15 and 16. These ridges 25, 22 and 26 are separated from one another by trench-like depressions 27 and 28, which extend up to the edge 11 of the substrate 1, and the ridges have longitudinal axes 250, 20 and 260, respectively, that all extend parallel to each other and perpendicular relative to the edge 11. These longitudinal axes, for example, are defined by central longitudinal axes of the strip-shaped parts of the second layer 15 in the ridges 25, 22 and 26.

For example, the three ridges 25, 22 and 26 are manufactured so that the mask layer 16 of amorphous Si forming a hard mask is first, preferably, anisotropically etched locally in the region of the depressions 27 and 28 to be produced later with an etchant that only attacks the amorphous Si but does not attack the material of the layers 15 or 14. Reactive ion etching (RIE) with HBr as an etchant is suitable for this purpose.

In the region freed of the mask layer 16, the second layer 15 is preferably anisotropically etched off down to the surface of the first layer 14 with an etchant which attacks the material of the second layer 15 but not the amorphous Si so that the depressions 27 and 28 that separate the ridges 25, 22 and 26 from one another occur. Reactive ion etching with $CHF_3$ as an etchant is suitable for this purpose.

The remaining strip-shaped part of the mask layer 16 of the amorphous Si is removed from the middle strip 22 but not from the flanking outer strips 25 and 26. For example, an etchant that acts only on the mask layer 16 of the middle ridge 22 and only attacks the amorphous silicon but not the material of the first and second layers 14 and 15 is used. To prevent removal of the layer 16 on ridges 25 and 26, etching masks can be provided.

A structure that is not explicitly shown occurs on the surface of the first layer 14 after this method step. This structure is composed of two raised ridges 25 and 26 composed of the second layer 15 and of one of the remaining strips of the mask layers 16 and of a middle raised ridge having a central longitudinal axis 20 that is composed only of a strip-shaped second layer 15.

Figure 3:
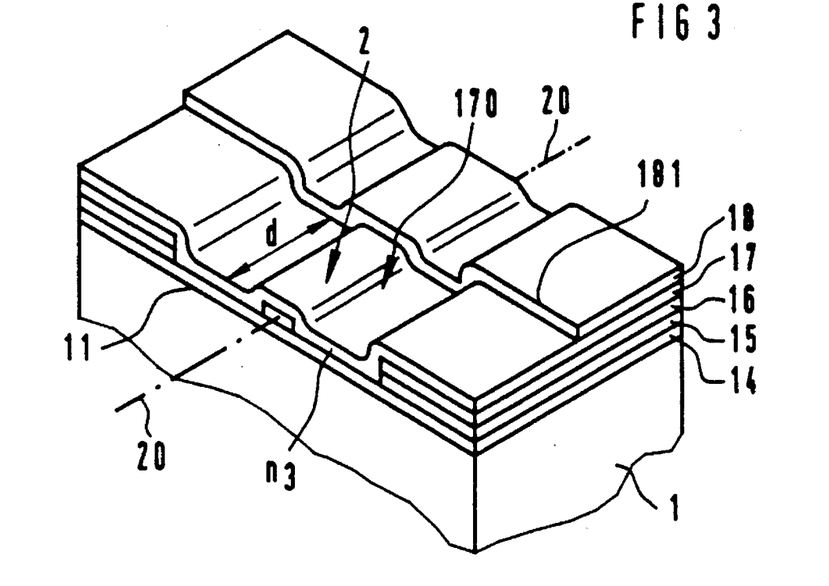
FIG. 3 shows after the removal of the first masking layer on the planar waveguide, the covering with the third layer and then applying a second masking layer.

This structure is then covered surface-wide with a third layer 17 of $SiO_2$ that is doped with $B_2O_3$. This third layer will have a refractive index $n_3 < n_2$ and, preferably, $n_3 = n_1$.

The strip-shaped layer 15 having the central longitudinal axis 20 and surrounded by the material of the first layer 14 and third layer 17 forms the planar waveguide 2 having the defined longitudinal axis. The strip-shaped second layer 15 forms the light-guiding core of this waveguide 2.

The third layer 17 is partially covered with a second or additional masking layer 18 of, preferably, amorphous Si so that the region 170 of the third layer 17 remains free of the additional or second mask layer 18 between an edge 11 of the substrate 1 and an edge 181 of the second mask layer 18. This second edge 181 is arranged at a distance from the edge 11 that is parallel to this edge and the spacing of the edge 181 of the second mask 18 from the edge 11 of the substrate 1 is essentially identical to the defined distance d of the end face 21 to be produced (see FIG. 4) in the planar waveguide 2 from the edge 11 of the substrate 1.

Figure 4:
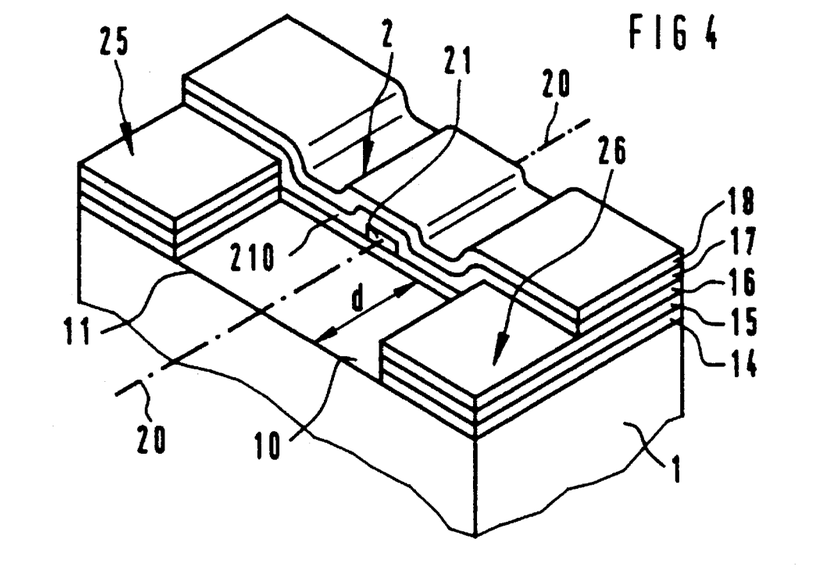
FIG. 4 shows removing all of the material of the first, second and third layers not protected by the second masking layer and/or the remaining portions of the first masking layer.

In the region 170 of the third layer 17 that is free of the second mask layer 18, this third layer is preferably anisotropically etched off with an etchant that attacks the material of the third layer 17 but not the amorphous Si layer 18. The strip-shaped second layer 15 and the first layer 14 on the raised ridges 25 and 26 between the two sub-regions of the strip-shaped parts of the first mask layer 16 that have become free are then preferably anisotropically etched off down to the carrying surface 10 of the substrate with one or more etchants that attack the material of the second layer 15 and the first layer 14 but not the amorphous Si of the first mask layer 16 and the second mask layer 18. The active ion etching with $CHF_3$ as an etchant is suitable for etching the third, second and first layers.

After this method step, the member shown in FIG. 4 having an uncovered end surface 210 that resides essentially vertically relative to the carrying surface 10 of the substrate 1 due to the anisotropic etching and which contains the end face 21 of the planar waveguide 2 is provided. This uncovered surface 210 is arranged at a distance d from the edge 11 of the substrate and parallel to this edge.

Isotropic etching with hydrofluoric acid can also be employed in the selective etching of the first, second and third layers in this last-cited method step when one forgoes a simultaneous manufacture of the face 210 perpendicular relative to the carrying surface 10 of the substrate, wherein the end face of the planar waveguide lies. Then the face 210 is manufactured in other ways, for example with a saw cut.

A trench-like depression 4 (FIG. 5) is etched in the carrying surface 10 of the substrate 1 of Si lying uncovered in front of the end surface 210 having the end face 21 of the planar waveguide with an etchant that only etches the Si but not the material of the first, second and third layers, wherein the first and second mask layers 16 and 18 and the amorphous Si are also removed. $SF_6$ in plasma or KOH solution is suitable as an etchant. The first and second layers 14 and 15 serve as masks during this etching.

As a result of this step, the member of FIG. 5 will occur and forms the final method step. This ultimate member is capable of serving as a substrate part for an arrangement of the invention.

The depression 4 is to be selected so that in terms of size and shape so that the fiber 3 can be arranged in the depression 4 and does not touch the inside wall 40 of the depression 4 when the longitudinal axis 30 of the fiber 3 in the depression 4 and the longitudinal axis 20 of the planar waveguide 2 are aligned. In an exemplary embodiment, the depression 4 has a depth t of 60 μm measured proceeding from the carrying surface 10 of the substrate 1 given a thickness T of 500 μm for the substrate 1.

The planar surfaces 5 and 6 of the substrate 1 lying in a first common plane 56 are defined by the uncovered surface of the second layer 15. In the direction vertical relative to the carrying surface 10 of the substrate 1, these surfaces 5 and 6 are very precisely defined with reference to the longitudinal axis 20 of the planar waveguide 2, since the core of the waveguide is composed of a strip-like part of the same, second layer 15 that lies on the defined surface of the layer 14. The height h of the longitudinal axis 20 of the planar waveguide 2 with reference to the common plane 56 of the two planar surfaces 5 and 6 of the substrate 1 in the example of FIG. 5 is essentially the same as half the thickness of the second layer 15. The longitudinal axis 20 thereby lies under the common plane 56 of the planar surfaces 5 and 6 of the substrate 1.

The edges 51 and 61 of the planar surfaces 5 and 6 of the substrate 1 that face one another and proceed parallel to the longitudinal axis 20 of the planar waveguide 2 are symmetrically arranged relative to this longitudinal axis 20 and are at a distance $d_3$ from one another which must be dimensioned so that the fiber can be introduced into the depression to such an extent that the longitudinal axis 30 of the fiber 3 and the longitudinal axis 20 of the waveguide are aligned with one another. In this position, the outer surface of the cladding 33 of the fiber 3 and the circumferential surface or periphery 32 of the end face 31 of the fiber 3 have a distance or, respectively, play $ from the floor of the depression 4.

When the distance $d_3$ of the edges 51 and 61 of the planar surfaces 5 and 6 of the substrate facing toward one another is selected to be the same as the diameter of the fiber 3 which has a core 34 in the common plane 56 of the planar surfaces 5 and 6 of the substrate 1, the longitudinal axis 20 of the planar waveguide 2 and the longitudinal axis 30 of the fiber 3 will be aligned. When the longitudinal axis 20 of the planar waveguide 2 lies exactly in the middle between the two edges 51 and 61, the edges 51 and 61 form an aligned and centering means for the automatic centering of the fiber 3 with respect to the planar waveguide 2 in the direction parallel to the plane 56 and perpendicularly relative to the longitudinal axis 20 of the waveguide 2. In this example of FIG. 5, the height h of the longitudinal axis 20 of the planar waveguide 2 with reference to the common plane 56 of the two planar surfaces 5 and 6 of the substrate 1 is extremely small and, in this case, the distance $d_3$ of the edges 51 and 61 can be selected equal to the diameter D of the fiber 3 when these edges act as alignment and centering means for aligning and centering the longitudinal axis 30 of the fiber 3 and the longitudinal axis 20 of the planar waveguide 2 relative to one another.

When the depression 4 is produced by etching with a KOH solution, deviating from the illustration of FIG. 5, a depression 4 in the form of a V-shaped groove arises insofar as a (100)-Si wafer is employed as a substrate 1. The cross section of this V-shaped groove must be made so large that when the fiber 3 is centered with its core 34 relative to the waveguide 2, the fiber does not touch the wall of this groove.

The alignment and centering of the fiber 3 onto the planar waveguide 2 in the direction vertical relative to the carrying surface 10 of the substrate or, respectively, relative to the common plane 56 of the planar surfaces 5 and 6 of the substrate occurs with the assistance of a holder part 7 on which the fiber 3 is fastened. The holder part 7 comprises two planar surfaces 8 and 9 lying in a second common plane 89 (see FIG. 6) between which the fiber 3 is secured so that the longitudinal axis 30 of the fiber 3 is parallel to the common plane 89. The vertical distance $d_1$ of the longitudinal axis 30 of the fiber 3 from the second common plane 89 is to be selected equal in amount to the height h at which the longitudinal axis 20 of the planar waveguide 2 is arranged with reference to the first common plane 56 of the planar surfaces 5 and 6 of the substrate 1.

The position of the longitudinal axis 30 of the fiber 3 with reference to the common plane 89 of the planar surfaces 8 and 9 of the holder part 7 is preferably defined by the exact etching of a V-shaped groove 70 into a polished (100)-Si wafer. The known etching rates of the Si dependent on crystal direction are thereby utilized, as disclosed by an article by K. E. Petersen entitled "Silicon as a Mechanical Material", *Proceedings of the IEEE*, Vol. 20, No. 5, May 1982, pp. 420–457. The groove 70 has inside walls 700, and the fiber is arranged in this groove so that it lies against the walls 700 and is then glued in or soldered cold or hot. The end face 30 of the fiber 3 and the end face 71 of the holder part 7 can be produced by sawing and polishing.

The planar surfaces 8 and 9 of the holder part 7 are placed onto the planar surfaces 5 and 6 of the substrate 1 so that the planar surface 8 of the holder part 7 lies on the planar surface 5 of the substrate and the planar surface 9 of the holder part 7 lies on the planar surface 6 of the substrate. The end face 31 of the fiber 3, which is lying between the faces 8 and 9, will face, respectively, toward and be opposite the end face 1 of the planar waveguide 2.

Given the holder part 7 lying such on the substrate 1, the longitudinal axis 30 of the fiber 3 automatically lies at the height of the longitudinal axis 20 of the planar waveguide 2 and only a lateral adjustment need be undertaken when the alignment and centering means is not provided with which the longitudinal axis 30 of the fiber 3 is automatically adjusted in the direction parallel to the longitudinal axis 20 of the waveguide 2, as well as exactly in the perpendicular direction relative to this longitudinal axis 20. An example of such an alignment and centering means has already been set forth above.

Alternatively or additionally thereto, an alignment and centering means can be provided that comprises at least one centering set-back or edge and one centering projection that are fashioned on the planar surfaces 5 and 8 or 6 and 9, respectively, of the substrate 1 and holder part 7. This edge and projection will coact with one another and will fit one another, since they are adjoined to one another in a direction parallel to these planar surfaces 5 and 8 and/or 6 and 9 and lie against one another in the direction perpendicular to the longitudinal axis 20 of the waveguide 2. Thus, the longitudinal axes 20 and 30 of the waveguide 2 and fiber 3 will be aligned in this condition. The centering set-back or edge is preferably composed of a groove elongated in the direction of the longitudinal axis of the waveguide 2 and the centering projection is preferably composed of a ridge elongated in this direction. In FIG. 5, for example, such a groove 12 is provided in the planar surface 5 of the substrate 1. The ridge 13 belonging thereto is provided in the planar surface 8 of the holding part 7. The situation can also be reversed. Alternatively, or additionally, such a groove and such a ridge can also be provided on the planar surfaces 6 and 9 of the substrate 1 and holder part 7.

For producing the groove 12, a strip-shaped etching region under which the groove 12 occurs in the layer 15 with the etching of the second layer 15 can be produced in the region of the mask 16 over the ridge 25 and/or 26 when etching with the first mask layer 16 to produce the ridges 25, 22 and 26 of FIG. 2. The appertaining ridge or ridges 13 must then be produced on the holder part 7. This type of alignment and centering means comprises a centering set-back and projection has the advantage that the distance $d_3$ between the edges 51 and 61 of the planar surfaces 5 and 6 facing toward one another can be greater than the diameter D of the fiber so that the fiber, whose diameter is smaller than or equal to this distance $d_3$, can also be advantageously aligned and centered.

In the two specific embodiments or examples of the alignment and centering devices that have been described, the holder part 7 lying on the substrate 1 is advanced in the direction of the longitudinal axis 20 of the waveguide 2 up to the end face 21 of the waveguide 2 and is subsequently clamped fast or permanently glued. Expediently, an immersion substance, for example a silicon glue, is introduced between the end face 21 of the waveguide 2 and the end face 31 of the fiber 3 lying opposite the end face 21.

In the above-described method for manufacturing the substrate part of FIG. 5, the third layer 17 is preferably applied by melting the strip-shaped part of the second layer 15 and the strip-shaped part of the one mask layer 16 over onto the ridges 25 and 26. The first mask layer 16, given this type of application of the third layer, must be composed of a material that is largely compatible in view of the thermal chemical behavior. As mentioned in the above-mentioned article by Schneider, Si, for example amorphous Si, is preferably employed. Moreover, all layers on the substrate can be produced as recited in this last-mentioned reference.

The arrangement of the invention is particularly suited for bidirectional optical transmission and reception modules.

Although various minor modifications may be suggested by those versed in the art, it should be understood that I wish to embody within the scope of the patent granted hereon all such modifications as reasonably and properly come within the scope of my contribution to the art.

I claim:

1. An arrangement for an optical coupling of a planar waveguide integrated on a carrying surface of a substrate and an optical fiber, said arrangement comprising a first substrate having a carrying surface with a trench-like depression in said carrying surface adjacent an edge of the substrate, a planar waveguide comprising a central longitudinal axis extending parallel to the carrier surface and an end face extending essentially vertically relative to said longitudinal axis and facing toward the first-mentioned edge of the substrate at a distance from said edge so that the trench-like depression is fashioned in the carrier surface between the end face of the planar waveguide and the edge of the substrate, said trench-like depression extending between two planar surfaces arranged on both sides of the longitudinal axis of the planar waveguide and forming a first common plane extending from the edge of the substrate in the direction of the longitudinal axis of the planar waveguide up to the end face thereof; and a fiber holding part having a recess between two planar surfaces of said part arranged on a second common plane, said fiber being secured in the recess with the axis of the fiber being at a distance $d_1$ relative to the second common plane of the planar surface of the holder part so that when the planar surfaces of the second common plane of the holder part engage the two planar surfaces of the substrate, the longitudinal axis of the fiber is essentially at the same height as the longitudinal axis of the planar waveguide with reference to the first common plane of said substrate and the fiber is arranged in the depression of the substrate with a lateral play to said axis that extends over an entire distance from the first-mentioned edge to the end face of the planar waveguide.

2. An arrangement according to claim 1, wherein the longitudinal axis of the planar waveguide is arranged in the first common plane formed by the two planar surfaces of the substrate, the longitudinal axis of the fiber is arranged in the second common plane shared in common by the two planar surfaces of the holder part, the planar surfaces of the substrate having etched edges lying opposite one another that proceed parallel to the longitudinal axis of the planar waveguide and are arranged at a distance from one another equal to or greater than an outside diameter of the fiber.

3. An arrangement according to claim 1, which includes first means for aligning and centering the longitudinal axis of the fiber and the longitudinal axis of the planar waveguide to one another being provided on the pair of planar surfaces of the substrate.

4. An arrangement according to claim 3, wherein the first means comprise at least one centering set-back and a centering projection that are fashioned on the planar surfaces of the substrate and the holder part lying opposite one another and fitted to coact with one another when the surfaces of the holder part engage the surfaces of the substrate to form a play-free connection therebetween to limit movement of said planar surfaces perpendicular to the longitudinal axis of the planar waveguide.

5. An arrangement according to claim 4, wherein the adjustment set-back comprises a groove extending in the direction of the longitudinal axis of the planar waveguide being provided in one of the planar surfaces and the centering projection comprises a ridge elongated in the same direction.

6. An arrangement according to claim 3, wherein the first means comprises two edges of the planar surfaces of the substrate that lie opposite one another, said surfaces extending parallel to the longitudinal axis of the planar waveguide and being arranged at a spacing that is dimensioned so that the longitudinal axis of the fiber touching these edges is aligned with the longitudinal axis of the planar waveguide.

7. An arrangement according to claim 1, wherein the fiber is arranged and fixed in a groove of the holder part fashioned between the planar surfaces of the holder part that are arranged in the second common plane.

8. An arrangement according to claim 7, wherein the cross section of the groove is V-shaped relative to the longitudinal axis of the fiber fixed in the groove.

9. An arrangement according to claim 8, wherein the holding part comprises anisotropically etchable material and the V-shaped groove is a groove produced by anisotropic etching.

10. A method for producing a planar optical waveguide integrated on a carrying surface of a substrate, said planar optical waveguide comprising a defined, central longitudinal axis parallel to the carrying surface with an end face essentially perpendicular relative to the longitudinal axis which faces toward a specific edge of the substrate that limits the carrying surface and is located at a distance from said edge, said substrate having a trench-like depression adjacent said edge and extending between the edge and the end face of the planar waveguide, said trench-like depression proceeding between two planar surfaces arranged on both sides of the longitudinal axis of the planar waveguide and lying in a common plane extending from the edge of the substrate in the direction of the longitudinal axis of the planar waveguide up to the end face thereof, said method comprising the steps of providing a substrate having a carrying surface on one surface thereof limited by an edge of the substrate proceeding on a straight line; providing a first layer of material having a specific first index of refraction surface-wide on said carrying surface; covering the first layer with a second layer of material having a second refractive index that is higher in comparison with said first index of refraction; covering said second layer with a first mask layer of a material that is resistant to at least one erosion means which erodes the material of the first and second layers and the substrate; forming at least three raised strip-like ridges in said second layer by local erosion at least by removing strip-like portions of said first mask layer and then removing the second layer exposed by the removed strip-like portions to form trench-like depressions extending from the edge of the substrate parallel to one another, said ridges having longitudinal axes that are parallel to one another and extending perpendicular to said edge; removing the first mask layer on the middle ridge; covering the middle ridge free of the first mask layer and the remaining portions of the first mask layer with a third layer of material having a third refractive index that is lower in comparison to said second refractive index; partially covering the third layer with a second mask layer of a material resistant to specific erosion means for eroding the third layer, said second mask exposing a region of the third layer between the edge of the substrate and an edge of the second mask layer extending parallel to said edge of the substrate and having a distance from the edge of the substrate essentially equal to a defined distance of an end face of the planar waveguide to be formed from the edge of the substrate; removing the third, second and first layers in the region of the third layer free of the second mask essentially perpendicular relative to the carrying surface of the substrate with the erosion means that does not attack the material of the first and second mask layers, and subsequently forming a trench-like depression into the region of the carrying surface freed of said first, second and third layers with an erosion means which does not attack the material of the first, second and third layers.

11. A method according to claim 10, wherein the erosion of the substrate to form the trench-like depression is by a material which attacks the first and second mask layers but does not attack the first, second and third layers.

12. A method according to claim 11, wherein the substrate is Si, the first layer is $SiO_2$ doped with $B_2O_3$, the second layer is $SiO_2$ doped with $B_2O_3$ and $TiO_2$, the third layer is $SiO_2$ doped with $B_2O_3$ and the first and second mask layers are Si, the step of removing strips of the first mask layer to form the three ridges includes eroding the first mask layer region-by-region with a reactive ion etching method employing $HB_3$ and said second layer is eroded with a reactive ion etching method employing $CHF_3$ in the regions of the second layer uncovered by the first mask layer, and said middle ridge freed of said one mask layer being covered with said third layer, said step of eroding of the third, second and first layers being done with a reactive ion etching method which does not attack the first and second mask layers and said step of forming the trench-like depression is carried out by etching with an etching material selected from $SF_6$ and KOH.

13. A method according to claim 12, wherein the first and second mask layers are composed of amorphous Si.

14. A method according to claim 11, wherein the end face of the planar waveguide is produced by sawing.

15. A method according to claim 11, wherein the first and second mask layers are composed of amorphous Si.

16. An arrangement according to claim 1, wherein the planar waveguide has a core formed by a core layer of a first material on the carrying surface of the substrate and the two planar surfaces forming the first common plane being formed by an upper surface of two bands of the core layer adjacent the planar waveguide.

17. An arrangement according to claim 16, wherein the trench-like depression in the carrying surface undercuts a portion of each of the two bands of the core layer.

18. An arrangement according to claim 1, wherein the trench-like depression in the carrying surface undercuts an edge of each of the two planar surfaces forming the first common plane.

* * * * *